Nov. 11, 1924.
E. T. FERNGREN
1,515,021
SHEET GLASS DRAWING FURNACE
Filed Oct. 11, 1922
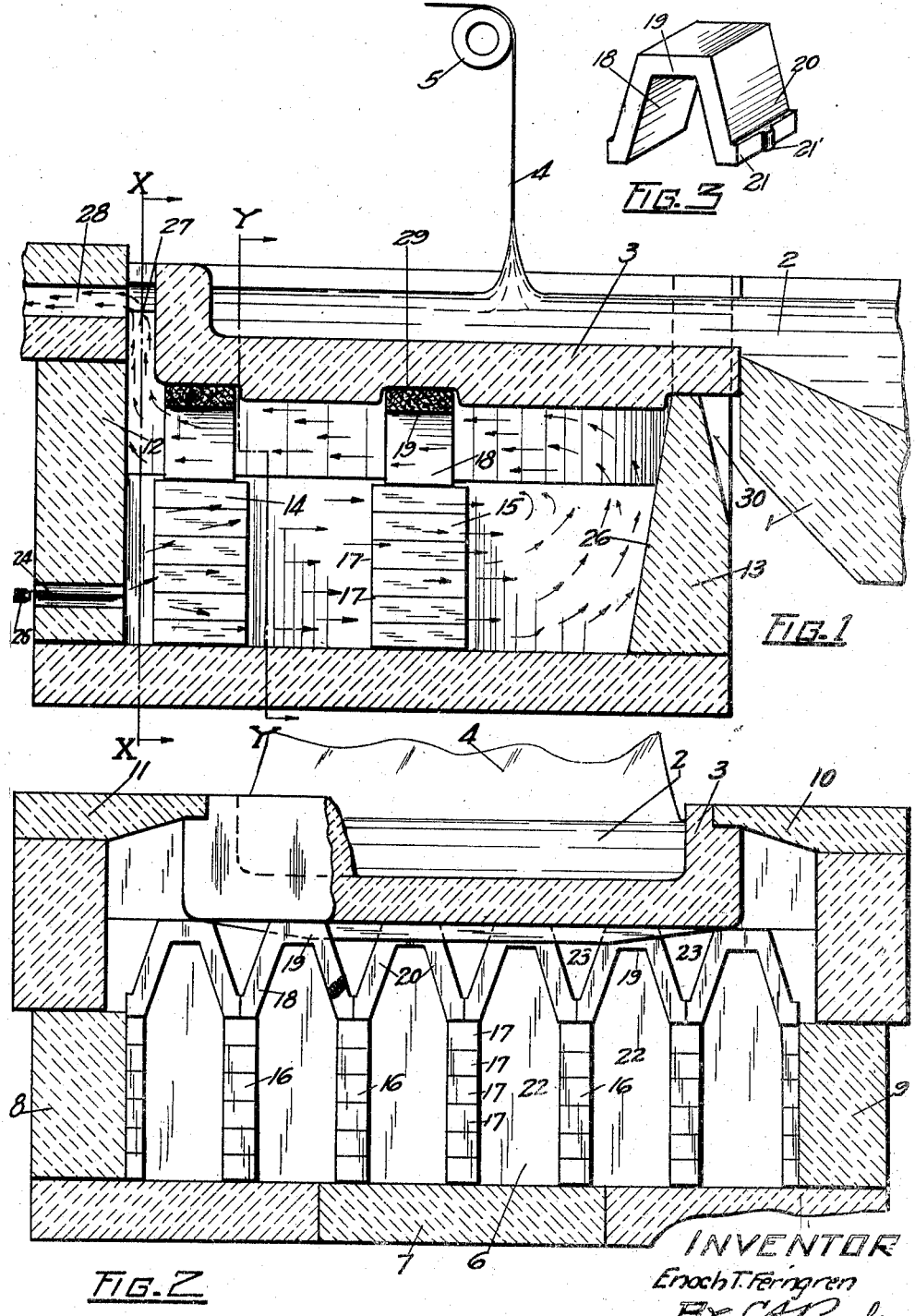
INVENTOR
Enoch T. Ferngren
By C. A. Rowley
ATTORNEY Patented Nov. 11, 1924.

1,515,021

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-DRAWING FURNACE.

Application filed October 11, 1922. Serial No. 593,885.

*To all whom it may concern:*

Be it known that I, ENOCH T. FERNGREN, a citizen of Sweden, residing at Toledo, in the county of Lucas and State of Ohio, have invented new and useful Improvements in Sheet-Glass-Drawing Furnaces, of which the following is a specification.

This invention relates to the art of drawing sheet glass and more particularly to an improved method and apparatus for supporting the pot or receptacle containing the molten glass from which the sheet is drawn.

In a sheet drawing apparatus of the Colburn type, as set forth for example in the patent to I. W. Colburn, 1,248,809, granted Dec. 4, 1917, molten glass from which the sheet is drawn is carried in a shallow receptacle or draw-pot, beneath which is a heating chamber for maintaining the glass at the proper drawing temperature. Since these pots are quite wide, and the clay or other material of which they are formed does not have a very high tensile strength, supports for the pot must be provided within the heating chamber, and these supports are in the form of arches to allow for the free passage therethrough of gases. As shown for example in Patent 1,248,809, referred to above, the upper member or tier of each of these supports or arches is so positioned that the pot is carried by the crowns of the arches and the heated gases pass between the spaced piers or posts which form the side limbs of the arches. This has resulted in an unequal heating of the glass within the pot, there being cooler areas above the contact points of the supporting posts and hotter areas therebetween caused by the closer contact of the heated gases. Since the sheet is drawn from the pot on a line parallel to the series of supporting posts, there will result alternate hotter and cooler areas across the width of the sheet.

The object of the present invention is to avoid this unequal heating of the molten glass within the pot and the consequent inequalities in the glass sheet. This result is accomplished by positioning the contact points for the supports, and therefore the greater thickness of the refractory heat-absorbing material, above the hotter portions of the chamber, and providing passages above the supporting piers or posts whereby the heating gases may come in direct contact with the bottom of the pot at these points and compensate for the lack of heat in those portions of the chamber occupied by the supporting piers. To further equalize the heating effect, the bottom of the pot is made thinner across those portions which come into direct contact with the supports. A further feature of the invention consists in so inclining the rear wall of the heating chamber that the hot gases will be forced to circulate through these passages above the supporting piers.

The invention will be better understood from the following detailed description of one approved form of the apparatus.

In the accompanying drawings:

Fig. 1 is a longitudinal vertical section through those portions of the apparatus involving the present invention.

Fig. 2 is a transverse vertical section, the left-hand portion of which is taken substantially on the line X—X of Fig. 1, the right-hand portion being broken away to substantially the line Y—Y of Fig. 1.

Fig. 3 is a perspective of one of the arch units.

At 1 is shown the delivery end of a continuous tank furnace or other suitable source of supply for the molten glass 2, which flows directly into the open end of the shallow draw-pot or receptacle 3. A sheet of glass 4 is drawn upwardly from the molten glass 2 in this pot by any approved apparatus. In the Colburn patent referred to above, this sheet is carried up and bent over a cooled bending roller 5 and thence carried away in a horizontal plane. It will be understood that the draw-pot and its supporting mechanisms which are hereafter described could be used with many other systems of drawing sheet glass than that here illustrated.

The pot 3 is supported above, and forms the larger portion of the roof of, a heating chamber 6, which surrounds the bottom and three sides of the pot, the fourth side being the one in direct communication with the furnace 1. This heating chamber consists of a bottom or floor 7, side walls 8 and 9, partial top walls 10 and 11, which together with the pot itself form the roof of the chamber, a front wall 12 and a rear wall 13. Since this pot has a considerable transverse area and is made of clay or other refractory material whose tensile strength is not high, it is not sufficient to merely support the pot around the sides or edges, but intermediate transverse supports must be provided across the bottom of the pot. In the form here shown, the pot is supported adjacent its rear edge upon the rear wall 13, and is supported adjacent its front edge and at a point midway its length upon similar transverse supporting members 14 and 15 of the peculiar type about to be described.

As each of these members 14 and 15 are of like construction, a description of one will suffice for both. A number of supporting piers or posts 16 are arranged at spaced intervals across the width of the chamber 6. These piers may be constructed of any suitable refractory material, and are here shown as built up of similar small fire brick 17. The piers 16 do not reach the full height of the chamber 6, and a series of similar supporting arches are positioned between the tops of the piers and the bottom of the draw-pot 3. These arches are formed by a transverse series of similar arched members 18, one of which is illustrated detached in Fig. 3. This member 18 comprises an upper horizontal supporting crown 19 and a pair of downwardly and outwardly sloping limbs 20. Each limb 20 terminates at its lower end in a short horizontally extending foot 21, which in operative position rests upon the top of the pier 17. The feet 21 may be provided with interlocking ribs and recesses to insure correct alignment. One of the ribs is indicated at 21', in Fig. 3. These arched members are preferably composed of some refractory material having a comparatively high tensile strength so that the limbs of the arched member may be made rather small in cross section so as to obstruct the passage of the heating gases as little as possible. One of the silicon-carbon or carborundum compounds will be found suitable for this purpose. It will be noted that when a series of these members 18 are arranged across the width of the chamber between the supporting piers and the bottom of pot 3, they form a continuous series of similar open arches, each alternate arch being inverted, and each adjacent pair of arches having one limb in common. The crowns 19 of each of the upright arches support the draw-pot 3, whereas the crowns of the inverted arches (formed by a pair of mating feet 21), rest upon the tops of the piers 16. In this way, the crown members 19 of the upright arches which come in direct contact with and support the draw-pot 3, are positioned directly over the open spaces 22 between the piers 16. Furthermore, the openings or passages 23 within the inverted arches are positioned directly over the piers 16; and there are no refractory members contacting with the bottom of the pot directly above these piers.

Near the bottom of the front wall 12 is a transverse series of openings 24 through which burners 25 are directed into the heating chamber 6. The inner surface 26 of the rear wall 13 slopes upwardly and outwardly, as shown in Fig. 1. The heated gases from burners 25 will pass to the rear of chamber 6 through the open arches 22 between the supporting piers 16, as indicated by the arrows in Fig. 1. These gases will here be deflected upwardly by wall 26 and will pass back along the lower surface of pot 3, a portion of the gases going through the passages 23 and coming in direct contact with the bottom of the pot. The gases go out through the vertical passage 27 around the front end of pot 3, and thence through flue 28. Obviously, the hotter portions of chamber 6 will be the open spaces 22 between the piers 16, and it will be noted that the supports 19 for the pot are located directly over these hotter portions of the chamber. The portions of the chamber 6 occupied by piers 16 will be cooler and cannot have as great a heating effect on the bottom of pot 3. To compensate for this, the passages 23 are provided whereby the returning gases come into direct contact with the bottom of the pot above these piers 16. In other words, the greater thickness of refractory heat-absorbing material, that is, the combined thickness of the bottom of the pot and the supports 19, is arranged above the greater source of heat, whereas the lesser thickness of refractory material, that is, the bottom of pot 3 between the supports 19, is positioned over those portions of the chamber where the heat is not so intense. By properly proportioning the several supporting members and passages, a practically uniform heating effect may be obtained across the entire width of the pot.

Although the structure just described is sufficient in itself to accomplish the desired results, the bottom of the pot 3 may be provided with transverse passages or cut-away portions 29 directly above the supports 19 or 13. By making the pot somewhat thinner above the supports, a more nearly uniform mass of refractory material is provided at all points above the heating chamber.

Preferably, the rear wall 13 is somewhat cut away, as shown at 30, to allow the cooler outside air free access to the joint between the pot 3 and tank 1, to avoid any possible leakage at this point.

This construction eliminates the alternate hot and cold areas across the width of the pot which have sometimes caused similar temperature variations and consequent irregularities in the sheet. The sheet will be drawn from glass of a uniform temperature and plasticity at all points across the pot, and it will have a uniform thickness, and the formation of waves and wrinkles in the sheet will be largely eliminated.

Claims:

1. The method of supporting above a heating chamber, the pot or receptacle from which sheet glass is drawn, whereby the molten glass will be heated uniformly at all points across the pot, consisting in providing a greater thickness of heat-absorbing material between the pot and the relatively hotter portions of the chamber and allowing free contact of the heated gases with the bottom of the pot above the relatively cooler portions of the chamber.

2. The method of supporting above a heating chamber, the pot or receptacle from which sheet glass is drawn, whereby the molten glass will be heated uniformly at all points across the pot, consisting in positioning the points of support for the pot above the hotter parts of the chamber, and providing passages for heating gases between the pot and the relatively unheated portions of the chamber.

3. In a sheet glass drawing machine, a draw-pot supporting stool, comprising a series of piers and a series of open arches resting on the piers, the pot contacting with and resting on the arches above the openings between the piers, and there remaining open passages for the heated gases along the underside of the pot directly above the piers.

4. In a sheet glass drawing machine, a draw-pot supporting stool, comprising a series of open arches, each alternate arch being inverted and each adjoining pair of arches having one limb in common, the pot resting on the crowns of the upright arches, and a series of piers on which the crowns of the inverted arches are supported.

5. In a sheet glass drawing machine, the combination with the draw-pot containing the molten glass from which the sheet is drawn, and the heating chamber beneath the pot, of a supporting stool for the pot located in the heating chamber, comprising a series of open arches, each alternate arch being inverted and each adjoining pair of arches having one limb in common, the pot resting on the crowns of the upright arches, and a series of piers on which the crowns of the inverted arches are supported.

6. In a sheet glass drawing machine, the combination with the draw-pot containing the molten glass from which the sheet is drawn, and the heating chamber beneath the pot, of a supporting stool for the pot located in the heating chamber, comprising a series of open arches, each alternate arch being inverted and each adjoining pair of arches having one limb in common, the pot resting on the crowns of the upright arches, and a series of piers on which the crowns of the inverted arches are supported, the bottom of the pot being cut away where it rests upon the stool, to provide a more uniform thickness of material between the molten glass and the heating means in the chamber.

7. In a sheet glass drawing machine, the combination with the draw-pot containing the molten glass from which the sheet is drawn, and the heating chamber beneath the pot, of a supporting stool for the pot located in the heating chamber, the bottom of the pot being cut away where it rests upon the stool, to provide a more uniform thickness of material between the molten glass and the heating means in the chamber.

8. In a sheet glass drawing machine, the combination with the pot containing the molten glass from which the sheet is drawn, of a heating chamber beneath the pot, the front wall of the chamber having openings for burners directed therethrough and the rear wall having its inner face sloping upwardly and outwardly, whereby the heated gases directed along the lower portion of the chamber will be carried upwardly and deflected back along the bottom of the pot.

9. In a sheet glass drawing machine, the combination with the pot containing the molten glass from which the sheet is drawn, of a heating chamber beneath the pot, a series of supporting piers within the chamber, means for supporting the pot upon the piers, whereby open passages are left directly above the piers, the front wall of the chamber having openings for burners directed therethrough and the rear wall having its inner face sloping upwardly and outwardly, whereby the heated gases directed along the lower portion of the chamber will be carried upwardly and deflected back along the bottom of the pot.

Signed at Charleston, in the county of Kanawha and State of West Virginia, this 5th day of October, 1922.

ENOCH T. FERNGREN.